United States Patent [19]
Rombalski, Jr. et al.

[11] Patent Number: 5,407,344
[45] Date of Patent: Apr. 18, 1995

[54] SINGLE DIRECTION CAM FOR INSERT MOLDING MACHINE

[75] Inventors: John Rombalski, Jr.; Joe E. Mahutga, both of Galesville; Garry P. Kenyon, Black River Falls, all of Wis.

[73] Assignee: Lake Center Industries, Inc., Winona, Minn.

[21] Appl. No.: 89,186

[22] Filed: Jul. 12, 1993

[51] Int. Cl.⁶ ............... B29C 45/33; B29C 45/44
[52] U.S. Cl. .................... 425/190; 264/318; 425/589; 425/595; 425/441; 425/443; 425/450.1; 425/451.4; 425/DIG. 58
[58] Field of Search ............ 425/190, 589, DIG. 58, 425/450.1, 451, 441, 443, 117, 451.4, 595; 264/318; 249/59, 161, 163, 165, 166, 96

[56] References Cited

U.S. PATENT DOCUMENTS

| | | | |
|---|---|---|---|
| 3,811,645 | 5/1974 | Feist | 425/DIG. 58 |
| 3,905,740 | 9/1975 | Lovejoy | 425/438 |
| 4,362,291 | 12/1982 | Fuke et al. | 425/441 |
| 4,541,795 | 9/1985 | Cole | 249/59 |
| 4,570,897 | 2/1986 | Holdt | 425/DIG. 58 |
| 4,902,212 | 2/1990 | Nakamura et al. | 425/DIG. 58 |
| 4,923,388 | 5/1990 | Nakamura | 425/577 |
| 5,234,329 | 8/1993 | Vandenberg | 425/186 |
| 5,312,243 | 5/1994 | Mertz | 425/577 |

FOREIGN PATENT DOCUMENTS

| | | | |
|---|---|---|---|
| 1262561 | 3/1968 | Germany | 425/DIG. 58 |
| 585991 | 12/1977 | U.S.S.R. | 425/DIG. 58 |

*Primary Examiner*—Khanh Nguyen
*Attorney, Agent, or Firm*—Dorn, McEachran, Jambor & Keating

[57] ABSTRACT

An insert molding machine has first and second mold sections, one of which is movable between open and closed positions, A slide carrying inserts is movable from an open position to a closed position wherein the slide and first and second mold sections define a mold cavity in which a part is molded. A single direction cam mechanism in the slide engages a pin in the movable mold section to releasably connect the slide and movable mold section during closure. The connection causes the slide to open upon subsequent opening of the movable mold section but allows the slide to be closed independently of the movable mold section.

7 Claims, 3 Drawing Sheets

SINGLE DIRECTION CAM FOR INSERT MOLDING MACHINE

BACKGROUND OF THE INVENTION

This invention relates to insert molding machines. Such machines make molded parts having embedded pieces, called inserts, integrally formed therein. For example, a part may have metal pieces forming electrical contacts molded within a plastic switch housing. The inserts are supported within a mold cavity on a slide prior to introduction of the molten molding material. When the part is cured the inserts, of course, are released from the slide and remain in the part.

The mold cavity is defined by the slide and two or more mold sections. At least one of the mold sections is movable between open and closed positions. One or more of the mold sections has an aperture which receives the slide. The slide is also movable between open and closed positions. In the open position the slide is retracted from the mold sections to facilitate loading of the inserts thereon. In the closed position the slide cooperates with the mold sections to define the mold cavity.

It is desirable to mechanically connect the movable mold section and slide so that only a single drive mechanism need be provided to move both parts. The mechanical connection between the movable mold section and slide causes them to open and close together. That is, opening or closing movement of a mold section simultaneously causes opening or closing movement of the slide. This has been done in the past with an angle pin entrapped in a closed slot. In effect, the angle pin and closed slot form inclined planes on the mold section and slide. Thus, vertical motion of the mold section induces horizontal motion of the slide and the two parts open and close together.

A drawback of this approach to effecting movement of the slide is that is does not permit inspection of the inserts in their final positions. Since the slide does not reach its fully closed position until the movable mold section also closes, it is not possible with conventional machines to verify that all of the inserts are properly located in the mold cavity. Sometimes slide movement will displace an insert but this cannot be seen because the mold cavity is closed when the slide finally gets to its closed position. Misplaced inserts cause defective molded parts. Hydraulically operated slides have been proposed to solve this problem but their introduction increases the complexity of the equipment and are more trouble than they are worth.

SUMMARY OF THE INVENTION

The present invention relates to insert molding machines and is particularly directed to a single direction cam mechanism that permits independent closing of the slide and movable mold section while causing simultaneous opening of these elements. Thus, the slide can be closed prior to closing the mold sections. Once the slide is closed, but before the mold sections are closed, inspection of the inserts can be made to assure they are properly positioned. Then the mold sections are closed preparatory to the actual molding operation. Once the part is cured, opening of the mold sections will cause the slide to open as well.

The single direction cam mechanism includes an angle pin connected to the movable mold section and a slot formed in the slide. The slot is defined by a throat and two walls on either side of the throat. Opposite the throat is an open side of the slot. The top of the slot is open also. Spring-loaded fingers or cams retractably extend across the open side of the slot. When the movable mold section is closed onto the previously-closed slide, the angle pin slips into the slot through the open side. A rounded surface on the leading edge of the angle pin engages a cam face on the cams to retract them and allow passage of the angle pin into the throat of the slot. Once the pin passes the cams, a flat surface on the trailing edge of the angle pin engages the cams and prevents withdrawal of the pin upon subsequent opening of the movable mold section. Engagement of the angle pin and cams causes the slide to open with opening of the movable mold section. When the movable mold section gets close to its fully open position the angle pin slips out the top of the slot, allowing the slide to move independently thereafter.

DETAILED DESCRIPTION OF THE INVENTION

Figure 1:
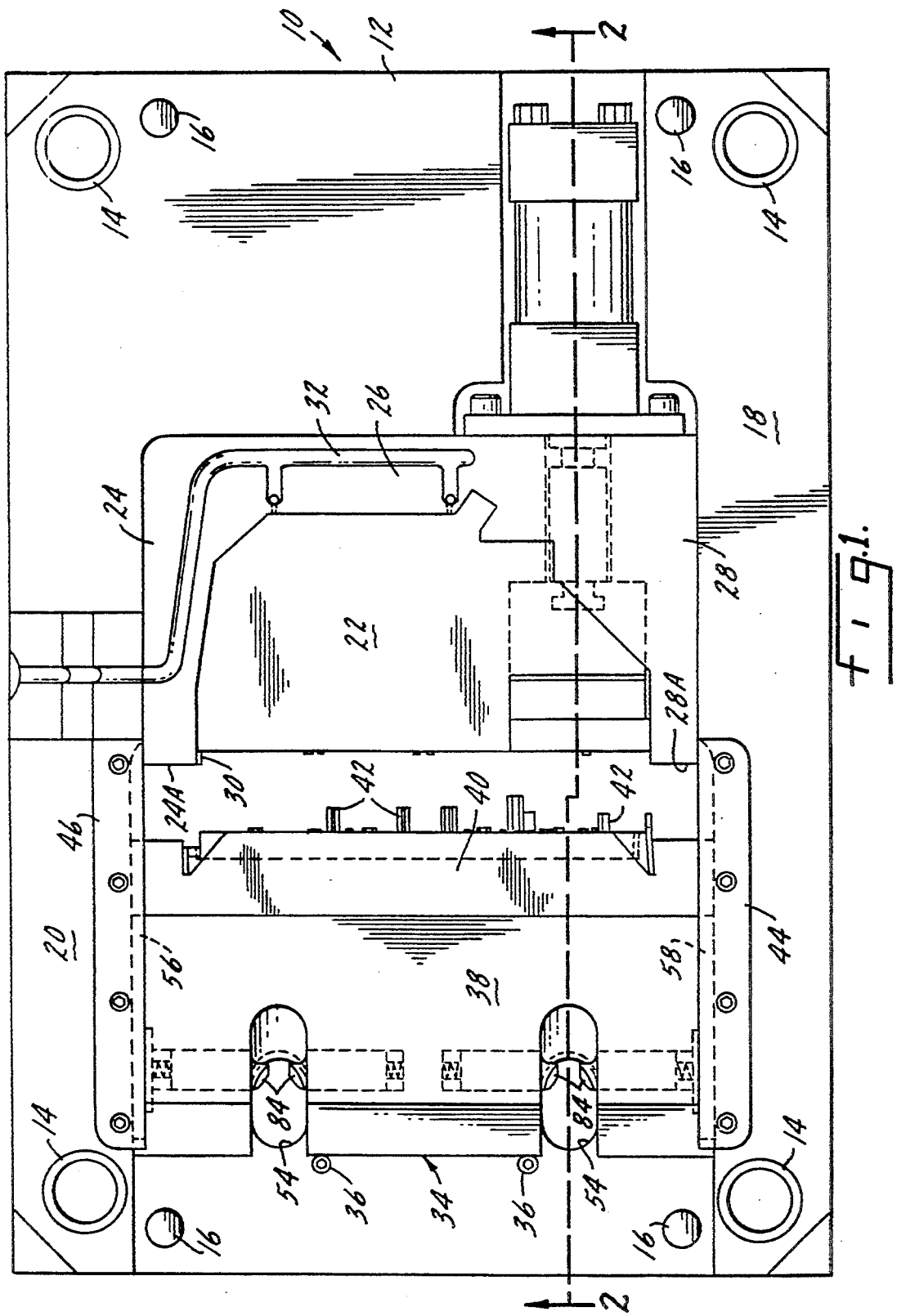
FIG. 1 is a plan view of the slide and stationary mold section with the slide in its open position.

FIG. 1 shows a first, stationary mold section generally at 10. The mold section includes a base plate 12 on which guide sleeves 14 and pins 16 are mounted to mesh with similar pins and sleeves on a second, movable mold section. A wall 18 extends along one edge of the base plate 12. A second wall 20 extends along a portion of the opposite edge of the base plate 12.

A mold cavity indicated at 22 is defined by the base plate 12 and three upstanding walls 24, 26, and 28. The walls are joined together to form a three-sided enclosure having an opening or aperture at 30. Walls 24 and 26 have a passage 32 for supplying molten mold material to the mold cavity 22.

The walls 18 and 20, together with the base plate 12, define a well in which a slide 34 is movable between open and closed positions. The slide is shown in FIG. 1 in its open position wherein it is retracted from the aperture 30. The extent of the slide's retraction is limited by stop screws 36. The closed position of the slide is defined by the front faces 24A and 28A of the walls 24 and 28.

The slide 34 has a main block 38 and an insert block 40 fastened to the front face of the main block. The front surface of the insert block holds the inserts, examples of which are shown at 42. The inserts are typically hand loaded into slots or retainers in the insert block 40. Details of the main block 38 will be described below. The slide 34 is retained in the well by a pair of rails 44 and 46 which are bolted to the walls 18 and 20 respectively.

Figure 2:
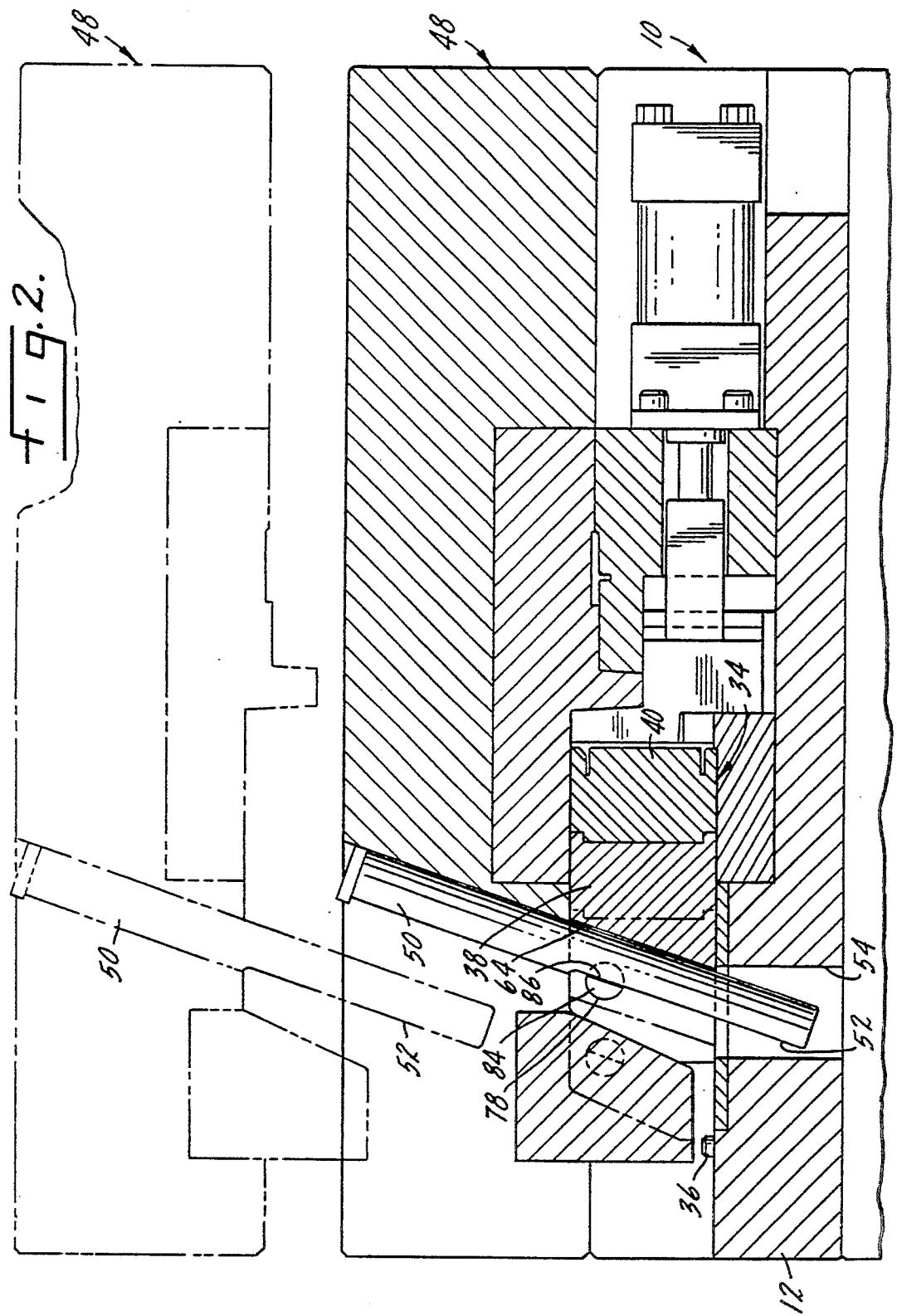
FIG. 2 is a section taken along line 2—2 of FIG. 1 with the slide and the movable mold section shown in solid lines in their closed positions and in phantom lines in their open positions.
Figure 3:
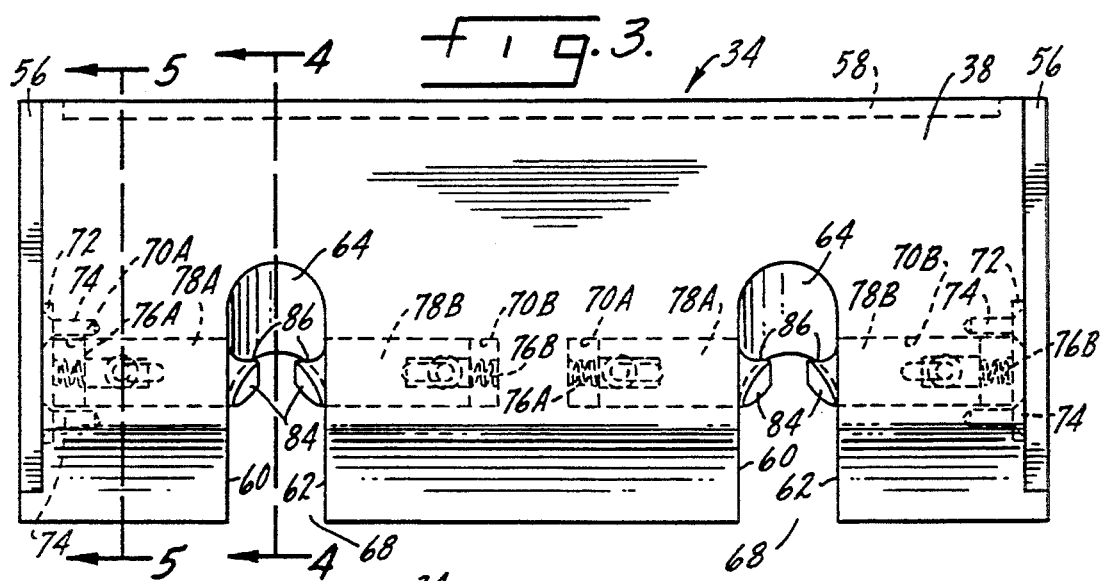
FIG. 3 is an enlarged plan view of the slide.
Figure 4:
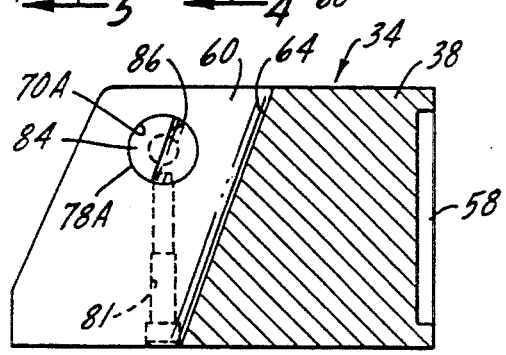
FIG. 4 is a section taken along line 4—4 of FIG. 3.
Figure 5:
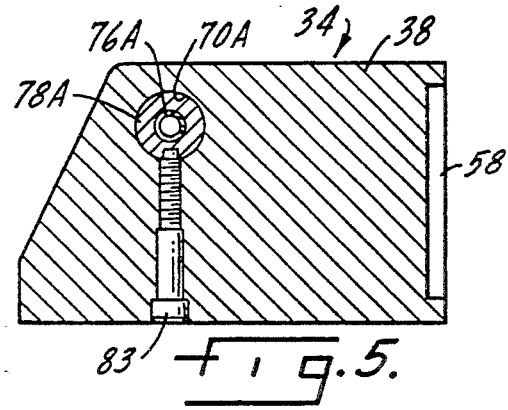
FIG. 5 is a section taken along line 5—5 of FIG. 3.
Figure 6:
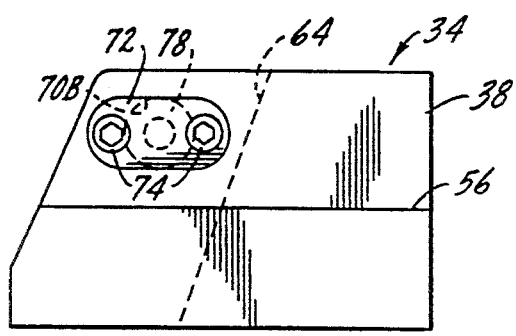
FIG. 6 is an end elevation view of the slide.

Turning now to FIG. 2, the second, movable mold section is shown generally at 48. The movable mold section reciprocates between a closed position shown in solid lines and an open position shown in phantom under the control of a conventional drive mechanism. The movable mold section closes the top of the mold cavity when in its closed position. As mentioned above, it has pins and sleeves (not shown) engageable with those of the stationary mold section to guide its movement and maintain alignment of the first and second mold sections.

The movable mold section 48 carries an angle pin 50. The angle pin is generally cylindrical except for a flat portion 52. There are two angle pins in this embodiment. The base plate 12 of the stationary mold section has a clearance opening 54 which receives the angle pin when the mold is closed.

Turning now to FIGS. 3-7, details of the slide are shown. The main block 38 has ledges 56 on each end. The ledges are engaged by the rails 44 and 46 to retain the slide in the well of the stationary mold section. The front side of the main block 38 has a depression 58 into which the insert block 40 fits. It will be understood that the main block 38 also has a plurality of cooling water passages which are not shown.

The slide also has slots formed in the back edge of the main block for receiving the angle pin 50. Two slots are shown in the illustrated embodiment. It will be understood that, depending on the particular application, a different number of slots may be used. The slots are identical and only one will be described in detail. The slots are defined by two side walls 60, 62, and a throat 64. Opposite the throat is an open side of the slot indicated generally at 68. It will be noted that the throat 64 is inclined with respect to the vertical, at the same angle as the angle pin 50.

The main block 38 of the slide has bores or pockets 70A and 70B drilled on each side of the slots. Each pocket 70 opens at one end into the slots and is closed at the other end. The pockets nearest the edges of the slide are closed by retainer plates 72 which in turn are fastened to the main block 38 by bolts 74. The closed end of the pockets receives a spring 76A, 76B. The springs bias a cam or finger 78A, 78B outwardly of the pockets 70.

Figure 7:
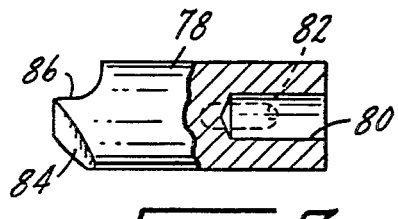
FIG. 7 is an enlarged plan view of a cam.

The cams 78 are all alike. Details are shown in FIG. 7. The cams are generally cylindrical with a bore 80 in their inner end which receives a spring 76. A groove 82 along one outer surface of the cams receives an anti-rotation screw 83 (FIG. 5) to prevent rotation of the cam in the pockets. Screw 83 fits in a hole 81 (FIG. 4) in the block 38. Cam face 84 on the outer end of the cam is directed toward the open end 68 of the slot. Opposite the cam face 84 is a flat portion 86 engageable with the flat 52 on the angle pin, as described below.

The use, operation, and function of the invention are as follows. With the movable mold section 48 raised and the slide 34 retracted to the position of FIG. 1, inserts 42 are hand loaded on the front face of the insert block 40. The slide is then closed by moving it to the position of FIG. 2, thereby closing off the aperture 30. With the inserts in their final position in the mold cavity, inspection can be had to assure that they are properly located. After inspection of the insert location, the mold is closed by lowering the movable mold section 48. As it descends the two angle pins 50 slip into the open sides 68 of the slots of the slide 34. Continued downward motion of the angle pins brings their leading, rounded edges into engagement with the cam faces 84 causing the cams 78a, 78B to retract into the pockets 70A, 70B. As the movable mold section reaches its fully closed position, the angle pins 50 move completely past the cams 78 and settle on or near the throat 64. The cams snap back to their fully extended position under the urging of the springs 76 with the flat surfaces 86 of the cams engaging the flats 52 of the angle pins.

Once the mold cavity is fully closed, molten mold material (typically some type of plastic) is introduced into the mold cavity 22 in a suitable manner, for example through the passage 32. After the molded part has cured, the mold is opened by raising the movable mold section 48 vertically. When the angle pins start moving upwardly the engagement of the flat surfaces 86 and the flats 52 causes the slide to open with the movable mold section. The slide moves horizontally as it is prevented from vertical motion by engagement of the rails 44 and 46 with the ledges 56. Continued upward movement of the movable mold section eventually causes the angle pin to slip out of the top of the slot, thereby freeing the slide for subsequent independent movement.

Whereas a preferred form of the invention has been shown and described, it will be realized that alterations may be made thereto without departing from the scope of the following claims. For example, it is not required that the slide be closed prior to the movable mold section. If desired, the slide could be left open when the closure of the movable mold section begins. The angle pins would then slip past the cams as described above, engage the throat 64 and push the slide to the closed position as the movable mold section closes.

We claim:

1. An insert molding machine having first and second mold sections at least one of which is movable between open and closed positions, a slide movable between open and closed positions, the mold sections and slide when in their closed positions cooperating to define a mold cavity in which a part is molded when the mold sections and slide are closed and from which a molded part can be removed when the mold sections are open, and engagement means for releasably connecting the slide to said at least one movable mold section such that the slide and movable mold section will open simultaneously but are closable independently.

2. The structure of claim 1 wherein the engagement means comprises a pin extending from one of the movable mold section or slide and a catch formed in the other of the movable mold section or slide, the pin and catch being disposed such that they are engaged in interfitting relation when both the slide and movable mold section reach their closed positions, the pin thereby causing the slide to open with the movable mold section upon subsequent opening of the movable mold section, the pin and catch becoming disengaged when the movable mold section reaches its open position.

3. The structure of claim 2 wherein the catch includes at least one slot formed in the slide and at least one cam retractably extending into the slot.

4. The structure of claim 3 wherein the cam has a cam face arranged to contact the pin entering the slot upon closure of the movable mold section and cause retraction of the cam, allowing the pin to move further into the slot and past the cam.

5. The structure of claim 3 wherein said at least one movable mold section reciprocates along an axis of motion and the pin and slot are disposed at an angle to the axis of motion, such that the pin has both axial and lateral components of motion and imparts lateral motion to the slide.

6. The structure of claim 1 wherein at least one of the mold sections defines a mold aperture providing access to the mold cavity, the slide fitting into and closing off the aperture when the slide is in its closed position.

7. The structure of claim 1 wherein the engagement means comprises a pin extending from one of the movable mold section or slide and a catch formed in the other of the movable mold section or slide, the pin and catch being out of engagement when the movable mold section and slide are in their open positions, the catch permitting relative movement of the pin past the catch such that they are engaged in interfitting relation when both the slide and movable mold section are moved to their closed positions, the catch entrapping the pin upon subsequent initial opening movement of the movable mold section, thereby causing the slide to open with the movable mold section, the pin and catch becoming disengaged when the movable mold section reaches its fully open position.

* * * * *